US011125357B2

(12) United States Patent
Kumar et al.

(10) Patent No.: US 11,125,357 B2
(45) Date of Patent: Sep. 21, 2021

(54) PIPE CLAMP

(71) Applicant: Illinois Tool Works Inc., Glenview, IL (US)

(72) Inventors: Ganesh Kumar, Maharashtra (IN); Mahantesh S. Gokavi, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/855,026

(22) Filed: Apr. 22, 2020

(65) Prior Publication Data

US 2020/0340602 A1 Oct. 29, 2020

(30) Foreign Application Priority Data

Apr. 24, 2019 (IN) .......................... IN201921016352

(51) Int. Cl.
*F16L 3/13* (2006.01)
*F16L 3/123* (2006.01)
*F16L 3/12* (2006.01)

(52) U.S. Cl.
CPC ................ *F16L 3/13* (2013.01); *F16L 3/1203* (2013.01); *F16L 3/123* (2013.01)

(58) Field of Classification Search
CPC ............ F16L 3/13; F16L 3/123; F16L 3/1203
See application file for complete search history.

(56) References Cited

U.S. PATENT DOCUMENTS

| | | | | |
|---|---|---|---|---|
| 6,216,986 | B1 * | 4/2001 | Kwilosz | F16L 3/13 248/73 |
| 9,494,258 | B2 * | 11/2016 | Flynn | F16L 3/13 |
| 2006/0273229 | A1 * | 12/2006 | Peterson | F16B 21/088 248/316.5 |
| 2008/0217488 | A1 * | 9/2008 | Carretero | F16L 3/13 248/65 |
| 2013/0146720 | A1 * | 6/2013 | Meyers | F16L 3/223 248/68.1 |
| 2015/0233495 | A1 * | 8/2015 | Shinoda | F16B 1/00 248/636 |
| 2016/0053918 | A1 * | 2/2016 | Flynn | F16L 3/13 248/68.1 |
| 2017/0350539 | A1 * | 12/2017 | Leo, Sr. | F16L 3/24 |
| 2018/0266458 | A1 * | 9/2018 | Lewis | F16L 3/13 |

(Continued)

FOREIGN PATENT DOCUMENTS

| | | | | |
|---|---|---|---|---|
| DE | | 3014578 A1 * | 11/1981 | ............ F16L 3/1203 |
| DE | | 29703643 U1 * | 4/1997 | ................ F16L 3/12 |

(Continued)

*Primary Examiner* — Eret C McNichols
(74) *Attorney, Agent, or Firm* — Quarles & Brady LLP

(57) ABSTRACT

A pipe clamp includes a linearly extending base portion. The base portion has a channel in which a pipe is positioned when inserted into the pipe clamp. The pipe clamp further includes two walled portions that extend from longitudinal edges of the base portion. The pipe clamp may further include a curved flexible support member that includes a fixed end and a moveable end. The fixed end is rigidly attached to an inner surface of one of the walled portions. Further, the flexible member is such that it extends in a curved manner, initially extending away from the inner surface of the walled portion and then curving inwards toward the walled portion into a recess.

19 Claims, 5 Drawing Sheets

(56) References Cited

U.S. PATENT DOCUMENTS

| | | | |
|---|---|---|---|
| 2018/0266588 A1* | 9/2018 | Netke | F16L 3/13 |
| 2020/0109800 A1* | 4/2020 | Bell | F16L 3/13 |
| 2020/0185899 A1* | 6/2020 | Leng | F16L 3/221 |

FOREIGN PATENT DOCUMENTS

| | | | |
|---|---|---|---|
| DE | 19636515 A1 * | 3/1998 | H02G 3/26 |
| EP | 2428715 A1 * | 3/2012 | B60R 16/0215 |

* cited by examiner

PIPE CLAMP

CROSS REFERENCE TO RELATED APPLICATIONS

This application is based on, claims priority to, and incorporates herein by reference in its entirety Indian Patent Application No. 201921016352, filed on Apr. 24, 2019, and entitled "PIPE CLAMP".

BACKGROUND

Pipes or such cylindrically shaped conduits may be used for transferring and transporting gaseous or liquid substances from one point to another. Such conduits may be either routed through a plane area, or in certain cases may even be routed through various architectural structures. In any case, the conduits may be secured to a rigid surface through clamps. Such clamps ensure that the conduit is secure and supported. Such clamps may be initially secured or fixed to the surface which is to provide support, and subsequently, the conduit may be inserted or installed within the clamp.

Such conduits may be repaired in case of any defects or may be subjected to routine maintenance. In other cases, the conduits may be routed through a different conduit path, owing to which the clamps and the conduits may be removed from their initial path, and then subsequently installed conforming to the desired path.

BRIEF DESCRIPTION OF DRAWINGS

The detailed description is provided with reference to the accompanying figures, wherein.

DETAILED DESCRIPTION

Figure 1:
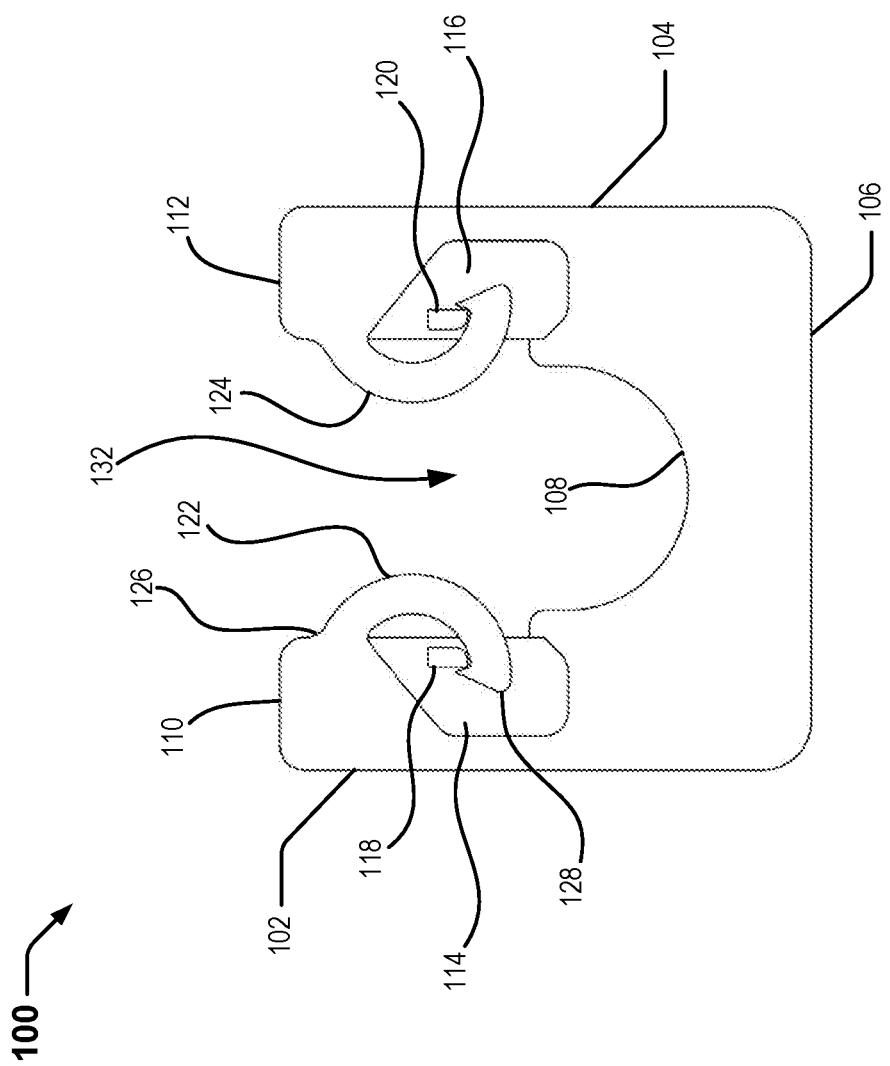
FIG. 1 illustrates a front view of a pipe clamp, in accordance with one implementation of the present subject matter.

Conduits or pipes may be used for transferring gaseous or liquid substances from one location to another. In certain circumstances, conduits (also referred to as pipes) may also be used for housing electrical wires. The pipes may be supported by, or secured to, rigid structures through clamps. In certain cases, pipes may be removed, replaced, or re-installed for repair or maintenance, or in cases where the pipe may have to be routed through a different pipe path. In such cases, the pipe may be extracted or removed from the clamps. The extraction (and insertion) of the pipe often makes it prone to damage. For example, a forceful removal of the pipe may cause perforations in the pipe, thereby rendering it useless. In other cases, the pipe may be removed by dismantling or breaking the clamp. As a result, a new clamp may be installed which may prolong the repair or maintenance procedure.

Furthermore, considerable efforts may be required while installing and securing the pipe in the pipe clamp. For example, substantial insertion forces for forcing the pipe into the pipe clamp may be applied. Such increased insertion forces also tend to have an adverse impact on the structural integrity of the pipes which are to be installed. Subjecting the pipes to higher insertion forces may result in damage that may affect operation. Moreover, certain clamps may be suitable for solid or rigid pipes, while other types of clamps may be required for flexible pipes, such as, e.g., a hose or bundy tubes, and cannot be used interchangeably.

Examples of a pipe clamp are described herein. During installation, the pipe is inserted into the pipe clamp. In one example, the pipe clamp comprises a linearly extending base portion. The base portion, in turn, further comprises a channel in which the pipe is positioned when inserted into the pipe clamp. The channel generally extends along the length of the base portion. The pipe clamp further includes two walled portions that extend from the longitudinal edges of the base portion. The walled portions extend in a direction which is perpendicular to a notional plane in which the base portion is present. The walled portions, along with the base portion, define an insertion space which is configured to receive the pipe during installation so that the pipe is positioned within the channel. In some embodiments, each of the walled portions further includes a recess. The pipe clamp further comprises a curved flexible support member that includes a fixed end and a moveable end. The fixed end is rigidly attached to the inner surface of one of the walled portions. The flexible member extends from the fixed end in a curved and a concaved manner, initially extending away from the inner surface of the walled portion, and eventually curving inwardly toward the walled portion into the recess so that the moveable end is positioned in the recess. In some embodiments, the pipe clamp is composed of a material which is one of nylon or polyoxymethylene. However, alternative or additional materials may be utilized without deviating from the scope of the present subject matter. In some embodiments, the pipe clamp may further include features that enable the pipe clamp to be rigidly fixed to a surface. For example, such features may include, but are not limited to a stud, a prong or an edge locking feature. Additional or alternative features may be included without deviating from the scope of the present subject matter.

As will be discussed and explained below, installation of pipes into the pipe clamp generally requires less insertion force than conventional designs. Furthermore, the curved surface of the flexible support member is not likely to cause damage to the pipes installed within the pipe clamp. In one example, the pipe clamp may be used for installing and routing pipes beneath the body of an automobile. These and other aspects are described further in conjunction with the accompanying figures. It should be noted that the examples as described are only illustrative and in no manner are intended to limit the scope of the subject matter.

Figure 2:
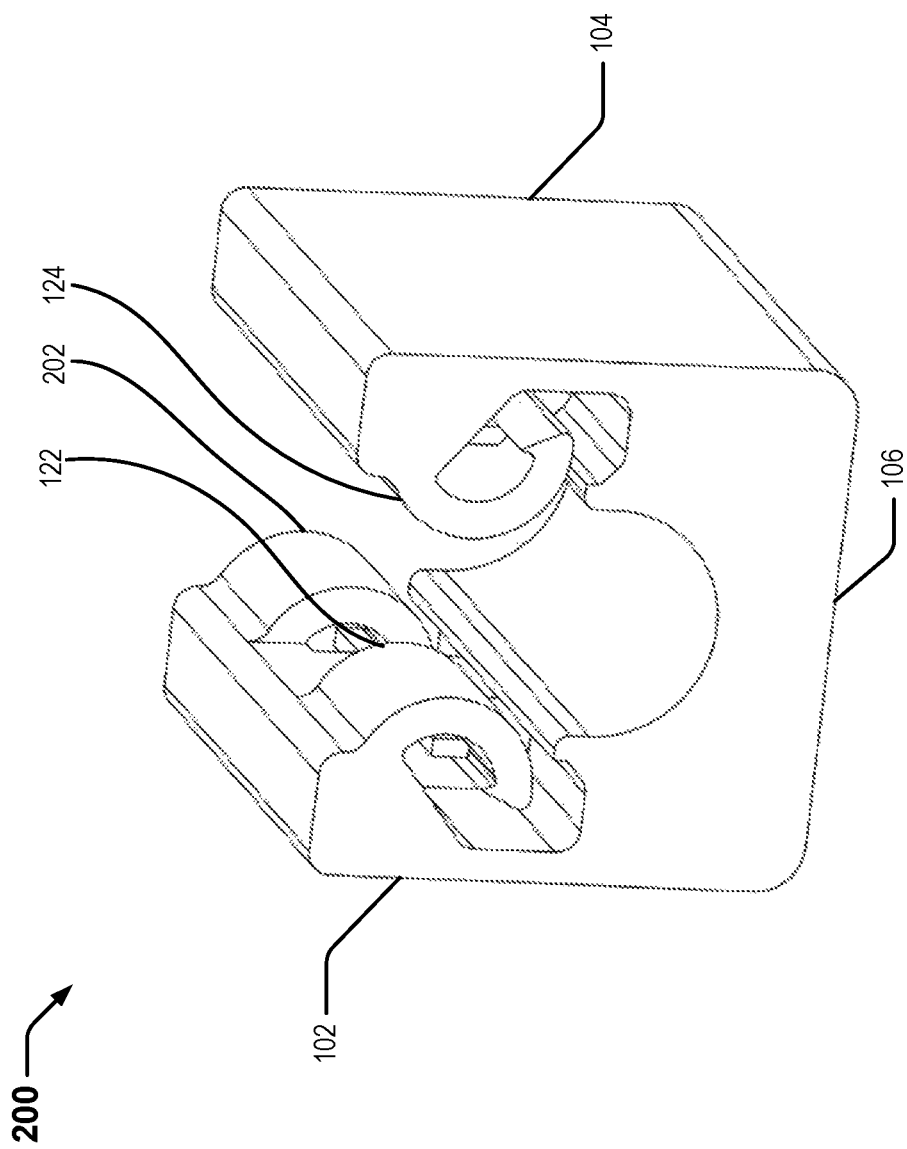
FIG. 2 illustrates a perspective view of a pipe clamp, in accordance with one implementation of the present subject matter.

FIGS. 1 and 2 illustrate a front view and a perspective view, respectively, of an example pipe clamp 100. Referring to FIG. 1, the pipe clamp 100 comprises walled portions 102, 104. The walled portions 102, 104 are supported by a base portion 106. Both the walled portions 102, 104 and the base portion 106 extend substantially linearly. The walled portions 102, 104 are such that they extend substantially perpendicularly with respect to a notional plane in which the base portion 106 lies. The pipe clamp 100 further comprises a channel 108. The channel 108 extends along a length of the base portion 106. The channel 108 is adapted and configured such that it may receive and accommodate a pipe. In one example, the channel 108 may be semi-cylindrically shaped and may have dimensions that conform with the dimensions of a pipe that may eventually be positioned within the pipe clamp 100. It may also be noted that the channel 108 may have any other shape without deviating from the scope of the present subject matter. Each of the walled portions 102, 104 extend from the base portion to top surfaces 110, 112, respectively (interchangeably referred to as surfaces 110, 112). The pipe clamp 100 may further include recesses 114, 116 in the walled portions 102, 104, respectively. The recesses 114, 116 in turn include locking elements 118, 120, respectively.

The pipe clamp 100 further includes flexible support members 122, 124. The flexible support members 122, 124 are provided on internal surfaces of the walled portions 102, 104, respectively. In one example, an additional number of flexible support members may be provided along the lengths of the walled portions 102, 104. In the present example, the flexible support members 122, 124 are positioned on their respective walled portions 102, 104, such that the position of one of the flexible support members, say flexible support member 122, on the walled portion 102 corresponds with the position of the other flexible support member 124 on the walled portion 104. For example, the flexible support member 122 and the flexible support member 124 are so positioned such that they are substantially the same distance from the surfaces 110, 112, respectively.

Further description and explanation are now provided with respect to the flexible support member 122. Since the flexible support members 122, 124 are substantially identically positioned on inner surfaces of the walled portions 102, 104, the description applicable to flexible support member 122 may also be applicable to the flexible support member 124. In the present example, the flexible support member 122 comprises a fixed end 126, with the fixed end 126 being integrally and rigidly coupled to the surface 110, and a moveable end 128. The flexible support member 122 extends from the fixed end 126 along a concaved and curved path and terminates with the moveable end 128 lying in the recess 114. The flexible support member 124 similarly extends from its respective walled portion 104, with its length following a curved path and terminating at moveable end 130, within the recess 116.

Still referring to FIG. 1, the walled portions 102, 104 and the base portion 106 generally define an insertion space 132 within the pipe clamp 100, through which the pipe is inserted. It is noted that when a pipe is not inserted into the pipe clamp 100, the moveable end 128 engages the locking element 118. When (or as) a pipe is inserted into the pipe clamp 100, the pipe urges against the flexible support members 122, 124. As the pipe moves further across the insertion space 132, it flexes or deforms the flexible support members 122, 124, thereby providing a suitable passage for the pipe. In one example, the pipe clamp may be composed of a material which is one of nylon or polyoxymethylene. However, other materials may also be used without deviating from the scope of the present subject matter.

Although only two flexible support members 122, 124 are depicted, in alternative examples, an additional number of flexible support members may also be present without deviating from the scope of the present subject matter. For example, FIG. 2 depicts the perspective view of a pipe clamp 200. In the example as depicted, the pipe clamp 200 may include flexible support members 122, 124, 202. Further, the flexible support members 122, 202 are both positioned on an inner surface of the walled portion 102. In one example, the flexible support members 122, 202 may be positioned so that they are aligned with respect to an axis parallel to the base portion 106. Although not visible, the pipe clamp 200 may further include an additional flexible support member opposite the flexible support member 202 and positioned on the inner surface of the walled portion 104. Although the present example illustrates two pairs of flexible support members, it may be noted that the pipe clamp 200 may include additional flexible support members along its length without deviating from the scope of the present subject matter. In yet another example, the pipe clamp may further include features which enable the pipe clamp to be rigidly fixed to a predetermined surface. Examples of such features include, but are not limited to, a stud, a prong or an edge locking feature. Other examples may also be included without deviating from the scope of the present subject matter.

Figure 3:
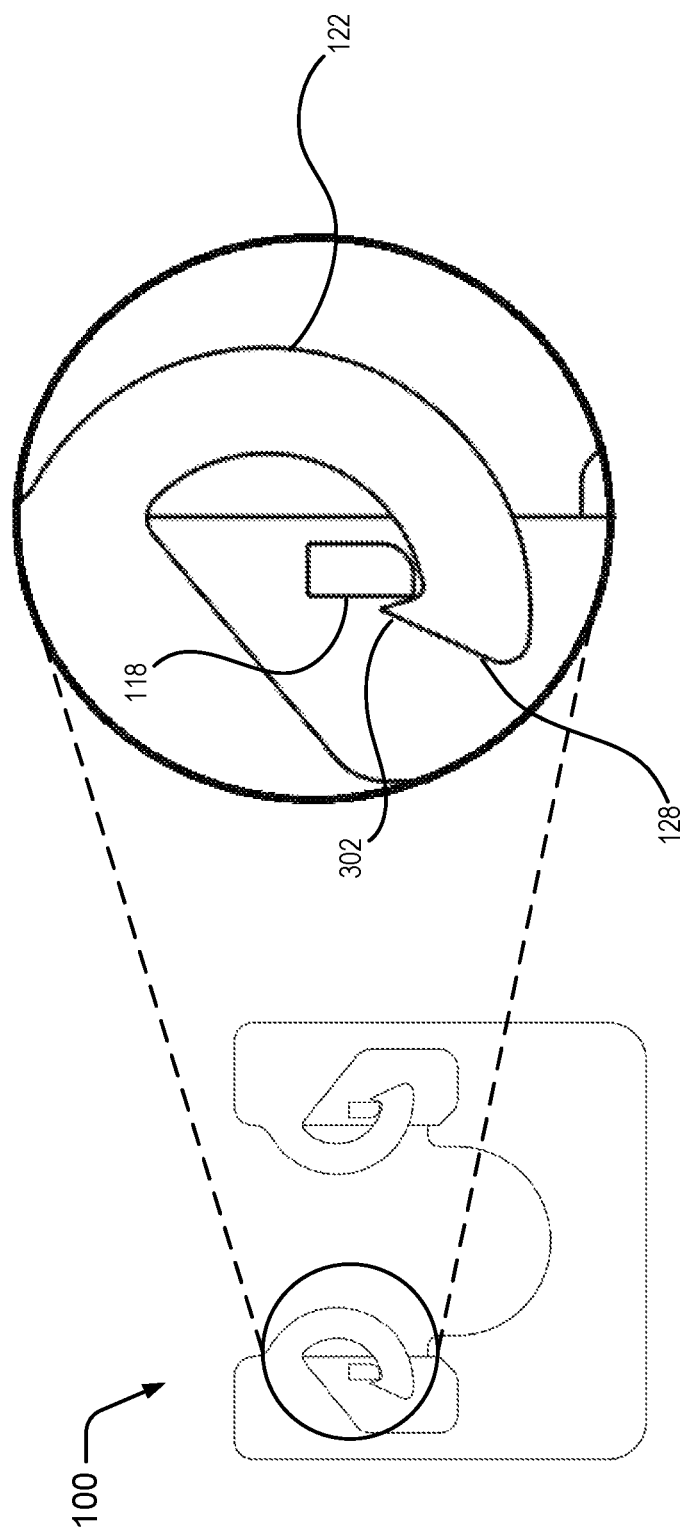
FIG. 3 illustrates an expanded view of a portion of the pipe clamp, in accordance with one implementation of the present subject matter.

FIG. 3 provides an expanded view of the moveable end 128 of a pipe clamp, such as the pipe clamp 100, as per one example of the present subject matter. As depicted, the flexible support member 122 of the pipe clamp 100 extends and ends at the moveable end 128. The moveable end 128 may further include an engaging element 302. The engaging element 302 may be configured to contact and engage the locking element 118. In one example, the engaging element 302 may be shaped as a triangular projection. However, the engaging element 302, according to alternate examples, may be of a variety of shapes without deviating from the scope of the present subject matter. As will be explained in the sections that follow, the locking element 118 may also define the manner in which the flexible support member 122 extends/flexes when a pipe is inserted into the pipe clamp 100. In one example, the locking element 118 may be manipulated with a tool, such as a screw driver, to disengage the locking element 118 and the engaging element 302. The operation and working of the pipe clamp 100 are further described in detail, in conjunction with FIGS. 4A-4B.

Figure 4A:
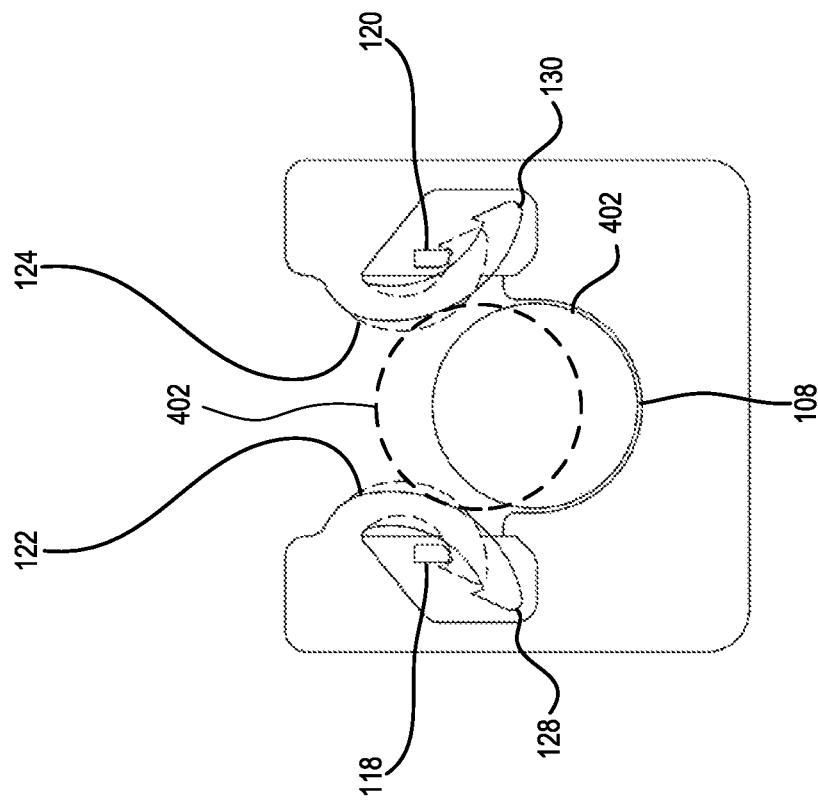
FIGS. 4A-4B illustrate the pipe clamp with a pipe in different stages of insertion, in accordance with one implementation of the present subject matter.
Figure 4B:
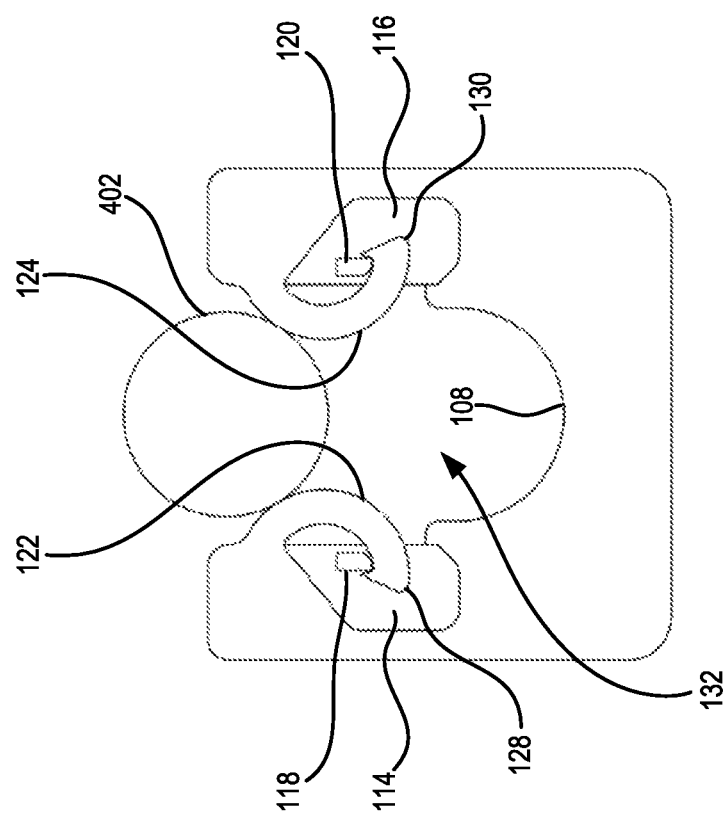
Figure 5:
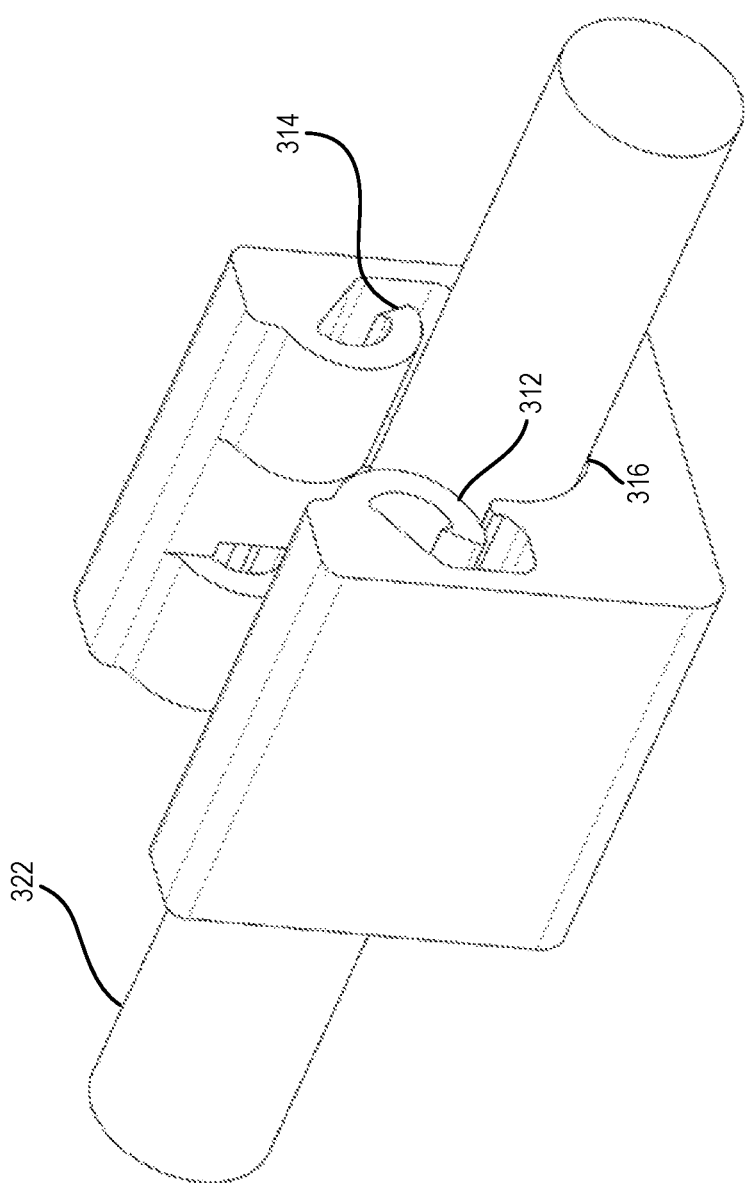
FIG. 5 illustrates a pipe clamp with a pipe, in accordance with one implementation of the present subject matter.

FIGS. 4A and 4B depict a pipe clamp, such as a pipe clamp 100, in various stages of installation of a pipe, such as pipe 402, into the pipe clamp 100. It is noted that the present figures depict only a portion of the pipe 402. The length of the pipe 402 may vary depending on the application for which the pipe 402 is intended. Accordingly, it may be useful or necessary for multiple pipe clamps, such as the pipe clamp 100, to be used for securing the pipe 402.

Referring particularly to FIG. 4A, the pipe 402 may be brought into proximity of the pipe clamp 100. The pipe 402 may initially come into contact with the flexible support member 122 and the flexible support member 124. At this stage, it may be noted that the flexible support member 122 and the flexible support member 124 are in their unflexed positions, with the moveable ends 128, 130 engaging the locking elements 118, 120. Referring now to FIG. 4B, as (or when) the pipe 402 continues to move into the insertion space 132, it abuts against the flexible support member 122 and the flexible support member 124. As the pipe 402 urges against the flexible support member 122 and the flexible support member 124, the shapes of the flexible support member 122 and the flexible support member 124 flexes. As the flexible support members 122, 124 flex, they move from their initial (i.e., unflexed) positions (depicted through dotted lines) to their stretched position. The stretching of the flexible support members 122, 124 results in an opening that is sized to conform with the size of the pipe 402. In FIG. 4B, the position of the pipe 402, as it urges against the flexible support members 122, 124, is also depicted as a dotted line.

Still referring to FIG. 4B, as the flexible support members 122, 124 flex, they move inwardly into the recesses 114, 116, respectively. For example, the moveable end 128 of the flexible support member 122 moves into the recess 114. At this stage, the moveable end 128 moves laterally into the recesses 114, 116 and toward the base portion 106. As the flexible support member 122 flexes, it disengages the locking element 118. In one example, the engaging element 302 (see, e.g., FIG. 3) disengages the locking element 118. While the flexible support member 122 flexes, its length continues to stay in contact with the locking element 118. In a similar manner, the flexible support member 124 and its moveable end 130 also move into the recess 116. Once the pipe 402 crosses both the flexible support member 122 and flexible support member 124, the pipe 402 is accommodated within the channel 108. When the flexible support members 122, 124 are no longer urged into the recesses 114, 116, the flexible support members 122, 124 may assume their initial (i.e., unflexed) positions as depicted by the dotted lines.

As would be understood, the flexible support members 122, 124 move and provide an opening for the pipe 402 to be inserted into. Such flexibility permits the pipe 402 to be inserted into the insertion space 132 with less insertion forces compared to a conventional system. Despite less insertion force required to insert the pipe 402, the flexible support member 122 of the pipe clamp 100 securely retains the pipe 402 when inserted. It may also be the case, that the pipe 402 is extracted from the pipe clamp 100. In such cases, the extraction forces required to extract the pipe 402 are generally greater than the insertion forces for inserting the pipe 402 into the pipe clamp 100. The greater extraction forces result from the action of the flexible support member 122. For example, extraction would involve pulling the pipe 402 out of the pipe clamp 100. As the pulling commences, the pipe 402 abuts against portions of the flexible support member 122 which are closer to the base portion 106. The abutting of the pipe 402 urges the flexible support members 122, 124 to move away from the base portion 106. However, because of the positioning of the locking element 118 and the engaging element provided at the moveable end 128, the flexible support members 122, 124 do not flex. Therefore, the flexible support members 122, 124 do not provide a suitable opening through which the pipe 402 may pass. As a result, the removal of the pipe 402 from the pipe clamp 100 may require an extraction force that is greater than the force required for inserting the pipe 402 into the pipe clamp 100.

Since the insertion force required is generally low, the pipe 402 is subjected to fewer deforming stresses and, therefore, the pipe 402 is less likely to get damaged during the installation process. Furthermore, owing to the greater amount of extraction forces required for removing the pipe 402 from the pipe clamp 100, the pipe 402 is better secured against any movement of the pipe 402 that may occur. In one example, with reference to FIG. 3, the locking element 118 is manipulatable through using a tool to disengage the locking element 118 and the engaging element 302. Once the locking element 118 is disengaged, the flexible support member 122 may be loosened to allow the pipe 402 to be removed from the pipe clamp 100.

Although aspects and other examples have been described in a language specific to structural features and/or methods, the present subject matter is not necessarily limited to such specific features or elements as described. Rather, the specific features are disclosed as examples and should not be construed to limit the scope of the present subject matter.

We claim:
1. A pipe clamp, comprising:
a linearly extending base portion;
a channel provided on the base portion, wherein the channel extends along a length of the base portion, with the channel being adapted to receive a pipe;
a first walled portion and a second walled portion, each having an inner surface with a recess that houses a locking element, wherein the first walled portion and the second walled portion extend from opposing ends of the base portion in a direction which is perpendicular to a plane in which the base portion is present, with the first walled portion, the second walled portion, and the base portion defining an insertion space; and
a first curved flexible support member with a fixed end and a moveable end, the first curved flexible support member being configured to flex between an unflexed position and a stretched position, and the moveable end having an engaging element that is configured to engage the locking element in the unflexed position,
wherein the fixed end is attached to one of the first walled portion and the second walled portion, the length of the first curved flexible support member extending from the fixed end into the insertion space with the flexible support member curving in a concaved path so that the moveable end is present in the recess, and
wherein, in the stretched position, the moveable end is disposed farther into the recess than in the unflexed position so that the engaging element disengages the locking element.

2. The pipe clamp as claimed in claim 1, wherein the pipe clamp is made of at least one of nylon or polyoxymethylene.

3. The pipe clamp as claimed in claim 1, wherein the inner surface of the first walled portion is opposite to and faces the inner surface of the second walled portion, and wherein the first walled portion and the second walled portion are provided with the first curved flexible support member and a second flexible support member, respectively, with a position of the first flexible support member on the first walled portion corresponding to a position of the second flexible support member provided on the second walled portion.

4. The pipe clamp as claimed in claim 1, wherein the channel is semi-cylindrical in shape having dimensions based on dimensions of the pipe to be accommodated in the pipe clamp.

5. The pipe clamp as claimed in claim 1, wherein the moveable end of the flexible support member is to undergo movement laterally inwards into the recess and towards the base portion, and wherein the movement is to occur upon a pipe being inserted into the insertion space, abutting against the flexible support member.

6. The pipe clamp as claimed in claim 5, wherein the movement of the flexible support member is restricted so as to prevent the movement of the flexible support member into the insertion space by the engaging element and the locking element.

7. The pipe clamp as claimed in claim 1, wherein the locking element is manipulatable through a tool so as to disengage the locking element and the engaging element, to permit extraction of the pipe from the pipe clamp.

8. The pipe clamp as claimed in claim 1, wherein the flexible support member is configured to flex from the unflexed position to the stretched position while maintaining a concaved, curved shape.

9. A pipe clamp, comprising:
a linearly extending base portion;
a locking element;

a channel provided on the base portion, wherein the channel extends along a length of the base portion, with the channel being adapted to receive a pipe;

a first walled portion and a second walled portion, each having an inner surface with a recess, the recess extending laterally from the inner surface to a depth less than a thickness of the respective first walled portion and the second walled portion, wherein the first walled portion and the second walled portion extend from opposing ends of the base portion in a direction which is perpendicular to a plane in which the base portion is present, the first walled portion, the second walled portion, and the base portion defining an insertion space; and a first curved flexible support member with a fixed end and a moveable end, wherein the fixed end is attached to one of the first walled portion and the second walled portion, the first curved flexible support member extending from the fixed end into the insertion space with the flexible support member curving in a concaved path so that the moveable end is present in the recess, wherein the moveable end comprises an engaging element, wherein the first curved flexible support member is configured to flex between an unflexed position and a stretched position, and wherein the engaging element is configured to engage the locking element in the unflexed position.

10. The pipe clamp as claimed in claim 9, wherein the recess houses the locking element.

11. The pipe clamp as claimed in claim 10, wherein the engaging element is adapted to engage and lock with the locking element so as to limit movement of the flexible support member into the insertion space.

12. The pipe clamp as claimed in claim 9, wherein the inner surface of the first walled portion is opposite to and faces the inner surface of the second walled portion, and wherein the first walled portion and the second walled portion are provided with the first curved flexible support member and a second flexible support member, respectively, with a position of the first flexible support member on the first walled portion corresponding to a position of the second flexible support member provided on the second walled portion.

13. The pipe clamp as claimed in claim 9, wherein the moveable end of the flexible support member is to undergo movement laterally inwards into the recess and towards the base portion, and wherein the movement is to occur upon a pipe being inserted into the insertion space, abutting against the flexible support member.

14. A pipe clamp, comprising:
a linearly extending base portion;
a locking element;
a channel provided on the base portion, wherein the channel extends along a length of the base portion, with the channel being adapted to receive a pipe;

a first walled portion and a second walled portion, each having an inner surface with a recess, wherein the first walled portion and the second walled portion extend from opposing ends of the base portion in a direction which is perpendicular to a plane in which the base portion is present, with the first walled portion, the second walled portion, and the base portion defining an insertion space; and a first curved flexible support member configured to flex between an unflexed position and a stretch position, the curved flexible support member including a fixed end and a moveable end, the fixed end being attached to one of the first walled portion and the second walled portion, the curved flexible support member extending from the fixed end into the insertion space along a concaved path so that the moveable end is disposed in the recess, wherein the moveable end comprises an engaging element, wherein the flexible support member is configured to flex from the unflexed position to the stretched position while maintaining a concaved, curved shape, and wherein the engaging element is configured to engage the locking element in the unflexed position.

15. The pipe clamp as claimed in claim 14, wherein the recess houses the locking element, and wherein the engaging element is adapted to engage the locking element so as to limit movement of the flexible support member into the insertion space.

16. The pipe clamp as claimed in claim 15, wherein the movement of the flexible support member is restricted so as to prevent the movement of the flexible support member into the insertion space by the engaging element and the locking element.

17. The pipe clamp as claimed in claim 14, wherein the inner surface of the first walled portion is opposite to and faces the inner surface of the second walled portion, and wherein the first walled portion and the second walled portion are provided with the first curved flexible support member and a second flexible support member, respectively, with a position of the first flexible support member on the first walled portion corresponding to a position of the second flexible support member provided on the second walled portion.

18. The pipe clamp as claimed in claim 14, wherein the channel is semi-cylindrical in shape having dimensions based on dimensions of the pipe to be accommodated in the pipe clamp.

19. The pipe clamp as claimed in claim 14, wherein the moveable end of the flexible support member is to undergo movement laterally inwards into the recess and towards the base portion, and wherein the movement is to occur upon a pipe being inserted into the insertion space, abutting against the flexible support member.

* * * * *